United States Patent [19]  [11] 4,080,637
Chase et al.  [45] Mar. 21, 1978

[54] SYNCHRONIZED TAPE SLIDE PROJECTOR CONTROL SYSTEM

[76] Inventors: Arthur B. Chase, 4150 Folsom St., San Francisco, Calif. 94110; Theo G. Pappas, 20 Ansom Rd., Hillsborough; Joseph R. Wilson, 1209 Bellevue Ave., Burlingame, both of Calif. 94010

[21] Appl. No.: 693,475

[22] Filed: Jun. 7, 1976

[51] Int. Cl.² ........................ G03B 31/00; G11B 31/00
[52] U.S. Cl. .......................................... 360/80; 353/15; 353/86; 235/449
[58] Field of Search ...................... 360/80, 79; 353/15, 353/86; 235/61.11 D

[56] References Cited

U.S. PATENT DOCUMENTS

| 3,772,473 | 11/1973 | Parham | 360/80 |
| 3,827,080 | 7/1974 | Gendrot | 360/80 |
| 3,844,646 | 10/1974 | Oury | 353/86 |
| 3,871,744 | 10/1974 | Rubin et al. | 353/15 |
| 3,881,185 | 4/1975 | Broline | 360/80 |

FOREIGN PATENT DOCUMENTS 926,498 5/1973 Canada .................................. 353/15

Primary Examiner—Steven L. Stephan
Attorney, Agent, or Firm—Donald C. Feix

[57] ABSTRACT

A control system synchronizes the operation of a plurality of controlled mechanisms such as slide projectors by means of unique frequency tone-binary code signals recorded on a magnetic tape. In a particular embodiment, six slide projectors and one movie projector are controlled in any desired combination or sequence and with two different fade-in, fade-out speeds and in synchronism with an audio program on another track of the tape.

In this specific embodiment, four different frequency tones are used in conjunction with binary codes to provide unique slide advance and lamp control of the projectors.

An encoder enables the user to make up his own programmed tapes.

12 Claims, 8 Drawing Figures

SYNCHRONIZED TAPE SLIDE PROJECTOR CONTROL SYSTEM

BACKGROUND OF THE INVENTION

This invention relates generally to a control system for automatically operating a plurality of controlled mechanisms in a pre-established sequence.

This invention relates particularly to a control system for actuating any number of slide projectors and movie projectors in any desired slide advance and lamp control combination or sequence of the projectors. The invention provides immediate cut of the lamp projectors or two or more variations in the speed of fade-in and fade-out of the lamp projectors and also coordination with an audio program recorded on a magnetic tape.

The sophistication of audio visual presentations has increased significantly within the past few years. The fade-in and fade-out control of projector lamps in particular is a technique often used for blending in and blending out images projected from a plurality of projectors operated in various combinations and in various sequences. Audio programs are also often used in conjunction with the multi-projector visual presentations.

In many situations it is desirable to automate the projector operations and to synchronize the visual presentations with an audio program.

The complexities and difficulties of constructing and operating a control system with multiple projectors, different projector types (e.g. mixes of slide projectors and movie projectors), fade-in and fade-outs of the projector lamps and synchronizing with an audio program increase sharply as the number of projectors increase. And providing different fade-in, fade-out times for different projector lamps produces an additional complexity. As a result, the prior art control systems were limited in the number of projectors which could be coordinated and also were limited in the types of operation which were possible.

U.S. Pat. No. 3,841,746 describes and illustrates a projector control system which operates a plurality of projectors in synchronization with an audio program by means of tone frequency signals prerecorded on one track of a magnetic tape. The system disclosed in the U.S. Pat. No. 3,841,746 works well up to a point. However, this system is limited in the number of control signals that can be utilized because of the problem of harmonics which can be produced when tone frequencies alone are used as the control signal on magnetic tapes. Conventional tape recorders have a usable band width of about 300 Hertz to 5,000 Hertz, and harmonics can be a problem when a relatively large number of tone frequencies are selected as control signals within this fairly narrow band width.

SUMMARY OF THE INVENTION

It is a primary object of the present invention to overcome the problems of the prior art noted above and particularly the problems of harmonics.

The present invention provides a control system which permits a virtually unlimited number of control signals to be encoded and effectively utilized on a magnetic tape of the kind played in audio conventional tape recorders such as cassette recorders.

The present invention uses a combination of a binary code and a minimum number of tone frequencies to give all of the control functions desired without problems of harmonics.

Because the present invention combines a binary code with a modulating frequency for producing a tape recorded signal, a large number of separate and distinct control signals can be recorded by an encoder and then effectively demodulated and recovered and applied for control functions without mix-up with other recorded control signals on the tape.

The control system constructed in accordance with the present invention requires only a single push of the start button to initiate a complete cycle of operation. The operation starts a turn-on of the recorder and projectors, continues through cycling of the projectors in any sequence desired by the programmer, and ends with turning off of the projectors—all in accordance with control signals pre-recorded on a magnetic tape and played back through a playback tape recorder.

The control system constructed in accordance with the present invention incorporates an encoding unit which has push buttons for controlling groupings of projectors (for example, left, center and right groupings) and for operating the projectors in each grouping for a cut (immediate slide advance) or a fade at one speed (for example, 3 seconds) or a fade at some other speed (for example, 6 seconds).

The buttons on the encoding unit can be depressed to operate projectors in all of the groups simultaneously or in any subcombination or in any sequence.

The encoding unit incorporates circuitry which produces a unique frequency tone-binary code control signal combined with a modulated clock frequency in a complex wave form recorded on a magnetic tape for each button that is depressed.

The encoding unit also produces a unique frequency code for a movie projector control while still another unique frequency code is used as a final stop.

In one specific embodiment the encoding unit comprises an encoder box in which nine upper push buttons control six slide projectors.

Each push button on the upper row records a signal which (on playback) immediately alternates the lamps and advances the slide on each projector whose lamp is cut out.

The second row of push buttons also alternates the lamps on the associated pair of projectors, but instead of alternating the lamps immediately, allows the lamps to fade-in and fade-out over a time period of 3 seconds. The slide advance of the projector which fades-out takes place at the end of the 3 second period.

In a similar manner the third row of push buttons control the associated pair of projectors, but with a 6 second fade-in and fade-out period.

A movie push button allows the insertion of a movie projector. When this push button is depressed the first time, it records a signal by which a related pair of slide projectors are cut out, and the movie is projected on the screen formerly occupied by that related pair of slide projectors.

A stop button records a signal which turns off all the projectors.

The encoding unit applies the unique frequency-code signals to one track of a magnetic tape, and a microphone applies an audio input to another track of the recording tape so that the control signals and audio input are synchronized.

The encoded tape is then played back in a playback recorder.

The audio output is supplied to a speaker for audio reproduction, and the code output is applied to a decoding unit.

The decoding unit receives the control signals originally applied to the control track of the tape during programming by the encoding unit, and the decoder takes these signals off of the tape in a manner which recovers the original code.

The signal voltages from the control track of the tape are first segregated by carrier frequency.

The clock and code signals which originally modulated their respected carrier frequencies are then demodulated, i.e. recovered for decoding purposes.

The decoding unit includes a decoder which segregates the frequencies as they are played back, and the decoded signals are supplied to a ramp generator which acts in association with a fade control and a slide advance.

The ramp generator generates a signal which provides the lamps of a selected pair of projectors with three options: (1) instant (cut) change-over of the lamp status (2) a 3 second fade (in which one projector of the air gradually fades-out and the other projector of the pair fades-in) and (3) a 6 second fade.

The ramp generator provides the fade control with a ramp shaped wave form whose inclination is determined by the code signal supplied to the ramp generator.

This output wave form of the ramp generator is supplied to one inlet of a fade control circuit. The other input to the fade control circuit is a saw tooth generator wave form derived from the power line frequency. These two voltage wave forms are combined to provide pulses which are time related to the 60 cycle voltage wave form of the line power supply to supply (a) all or (b) an increasing part or a decreasing part of the line power supply to the projector lamp to produce (a) an immediate cut or (b) a time controlled fade-in or fade-out.

The output of the ramp generator is also supplied to a plus input of a comparator circuit in the slide advance circuit to produce a slide advance at the proper time in relation to the cut or the fade-in or fade-out of the lamp of that particular projector.

A control system and mode of operation of a control system which has the structural features described above and which is effective to function in the manner described above constitute further specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 4 is a timing diagram for the encoder shown in FIG. 1 and FIG. 3.

FIG. 8 is a schematic view showing circuit details of the start-stop line connections for the slide projectors and the movie projector shown in FIG. 1. FIG. 8 also includes a schematic view of the lamp voltage bias control circuit for generating the saw tooth wave form for the lamp voltage bias control of the slide projector lamps.

DESCRIPTION OF THE PREFERRED EMBODIMENTS

Figure 1:
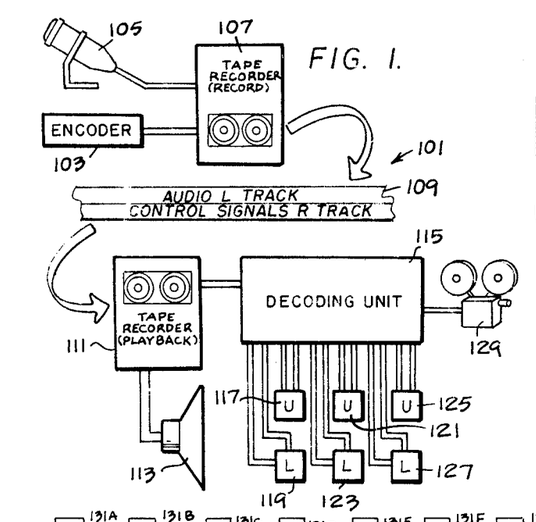
FIG. 1 is a block diagram of a control system constructed in accordance with one embodiment of the invention and illustrates the way in which the major components of the system are functionally interrelated.

A control system for controlling a plurality of controlled elements in response to a unique tone frequency-digital code signal for each controlled element is indicated generally by the reference numeral 101 in FIG. 1.

The control system shown in FIG. 1 is illustrated as a projector control system for synchronizing the operation of the slide change mechanisms of six slide projectors 117, 119, 121, 123, 125 and 127, the operation of the fade-in and out controls of the lamps of the six slide projectors, and the operation of a movie projector 129 with an audio program.

While the control system 101 shown in FIG. 1 is illustrated as controlling six slide projectors and one movie projector, it should be noted that the present invention is not limited to this specific number of controlled elements but can instead be used to control a greater or lesser number of projectors and can be used also to control elements other than slide projectors as will become more apparent from the detailed description to follow.

As shown in FIG. 1, the system 101 includes an encoding unit 103 for producing a series of unique tone frequency-digital code input signals, a microphone 105 for an audio input, a tape recorder 107 for recording the tone frequency-digital code input signals on one track of a tape 109 and for recording the audio input on another track of tape 109, a playback tape recorder 111 (which can be the same recorder as the recording tape recorder 107) for playback of the audio output and tone frequency-digital code output signals, a decoding unit 115 for decoding the original code (removing the carrier frequency, recovering the original code and routing the original code signal to a specific output in the proper time sequence) and a speaker 113 for audio reproduction of the audio input.

The projector control system 101 shown in FIG. 1 is effective to control the operation of the left, center and right projectors in sequence or in combination. That is, a left projector, a center projector and a right projector can all be operated at the same time, or two at a time or one at a time in any desired sequence. This is accomplished by assigning three different frequencies to the three vertical rows of control buttons on the encoding unit 103. Buttons A, B, C and D are all associated with one frequency F1. Buttons E, F, G and H are all associated with another frequency F2, and buttons I, J, K and L are all associated with a third frequency F3, as described in more detail below.

Also, as indicated by the legends on the lefthand side of the encoding unit 103 in FIG. 1, each slide projector in a left, center, right pair is controlled to perform both a cut in-out slide advance function and a lamp fade in-out function at one of two fade speeds (a 3 second fade or a 6 second fade).

In the present invention, four frequency tones (frequency tones F1, F2 and F3 as noted above and a fourth clock frequency EE to be described below with reference to FIG. 3) operate in conjunction with binary codes to provide the control track of the tape 109 with unique signals for the slide advance and the lamp control of the slide projectors. Each slide projector is assigned a unique tone frequency-binary code to provide the necessary control from the tape track.

Also, a unique tone frequency-binary code is devoted to the movie projector control, while still another tone frequency-binary code is used as a final stop (as described in more detail below).

The physical layout of the controls on the encoder 103 is illustrated in FIG. 1.

The upper nine push buttons control the slide projectors.

Each push button on the upper row (buttons A, E, I) immediately alternates the lamps in a related projector pair (starting from the upper projector to the lower projector, as will be described in greater detail below with reference to FIG. 6). Each push button on the upper row also advances the slide on the projector whose lamp was cut out.

The second row of push buttons (buttons B, F and J) also alternate the lamps on the associated pair of projectors; but instead of alternating the lamps immediately, the push buttons in the second row allow the lamps to fade-in and fade-out over a time period of three seconds. The slide advance of the projector which fades-out takes place at the end of the 3 second period.

In a similar manner, the third row of push buttons control the associated pairs of projectors, but with 6 second fade-in and fade-out.

The movie push button (button H) allows the insertion of a movie projector. When this button is depressed the first time, the center pair of slide projectors are cut out, and the movie is projected on the screen formerly occupied by the center pair of slide projectors.

The stop button (button L) turns off all projectors.

In the encoding unit 103 shown in FIG. 1, the button D is a spare button.

Figure 3:
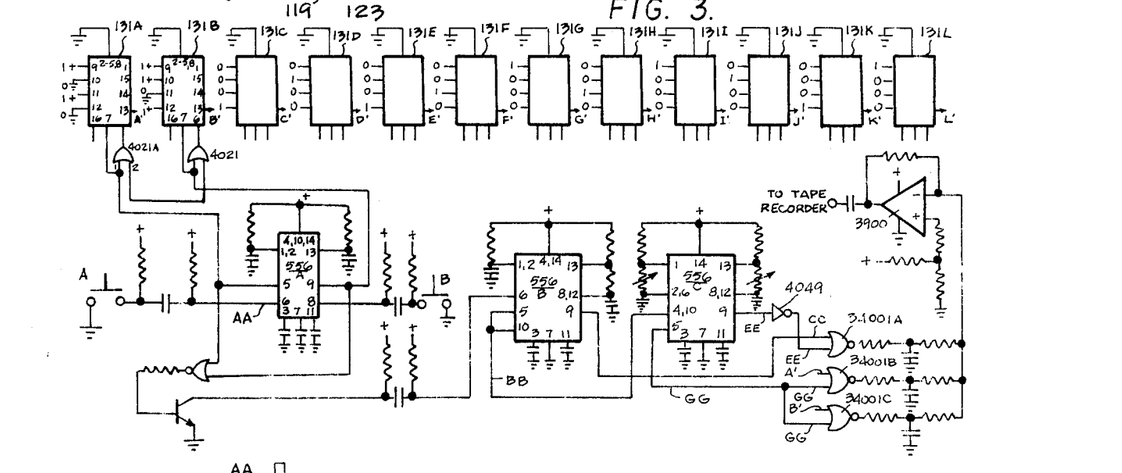
FIG. 3 is a schematic view showing circuit details of the encoder of the FIG. 1 control system.

FIG. 3 shows details of the electrical circuitry for the encoder 103.

DESCRIPTION OF THE ENCODER

As illustrated in FIG. 3, the encoder 103 comprises twelve shift registers 131A–131L, one shift register for each button A–L.

Each of these shift registers is an integrated circuit (IC), and as indicated by the model No. 14035 within each shift register, each register in a specific embodiment of the present invention may be a standard model No. 14035 IC as made by Motorola Corporation and other companies.

Standard electronic industry model numbers of components used in the specific embodiments of the circuits illustrated in FIGS. 3–8 are indicated in the drawings and description to follow.

In the present invention each shift register is used to convert a binary code from a parallel format to a serial format.

The parallel code format is formed by connecting the inputs 9, 10, 11 and 12 of the shift register to the proper voltage levels. A ground at a particular input ultimately generates a binary 0 in the serial format.

In a similar manner a positive voltage at one of these inputs generates a binary 1.

Each shift register 131 is permanently wired at inputs 9, 10, 11 and 12 to produce a unique (different from each other shift register 131) code. Since there are four inputs, each of which can be wired to either ground or positive, there are four squared or sixteen unique codes to choose from.

Nothing happens in the conversion process of a shift register 131 until an associated push button is depressed.

For example, when push button A is depressed, one-half of IC 556A sends a short voltage impulse AA (FIG. 3 and FIG. 4) to the shift register 131A. This voltage impulse AA is applied to pin 7 of the shift register 131A and to pin 1 of a gate 4071A and from gate 4071A to pin 6 of the shift register 131A. The IC 556A is a dual oscillator (two oscillators in one package) with one side operating the code 1 (the A' code shown in FIGS. 3 and 4) of the shift register 131A and the other side of the dual oscillator 556A operating the code 2 (the code B' from the shift register 131B shown in FIGS. 3 and 4).

As noted above, the number 556 refers to the model number of this dual oscillator as made by a number of companies, including Fairchild, National Semiconductor and Signetics Corporation.

Figure 4:
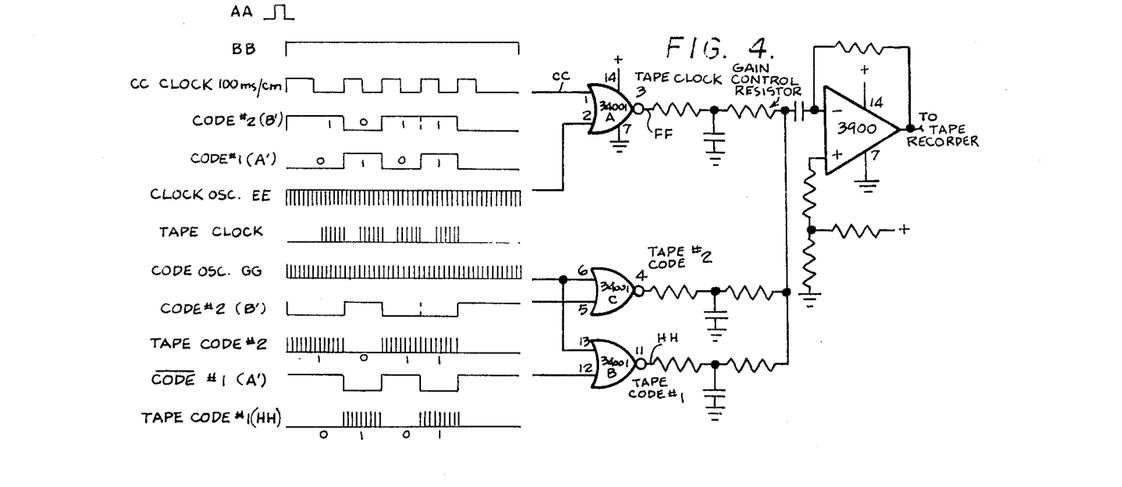
FIG. 4 also shows, in the righthand side of FIG. 4, how various ones of the signals in the timing diagram are transmitted on certain lines in the schematic circuit shown in FIG. 3.

The impulse AA corresponds to the wave form AA shown on FIG. 4 of the timing diagram. Subsequent double alphabetic letters refer to corresponding wave forms of FIG. 4. These wave forms appear at the circuit locations shown in FIG. 3 and described below.

Only one dual oscillator 556A is shown in FIG. 3 to simplify the illustration, but in the specific embodiment of the encoder shown in FIG. 3 there are five additional dual oscillators 556 with each additional dual oscillator associated with a corresponding pair of shift registers. For example, a dual oscillator 556 is associated with the shift registers 131C and 131D and another oscillator 556 is associated with the shift registers 131E and 131F, and so on.

The impulse AA transfers the parallel code described above to the serial side of the shift register 131A. The falling edge of this impulse (see FIG. 4) then initiates a four cycle clock voltage CC, which in turn is set to the shift register 131A to complete the parallel to serial conversion. The resulting serial code A' is a negation of the parallel code and emerges from pin 13 of the shift register 131A.

Each time push button A is depressed, the same serial code emerges from pin 13 of the shift register 131A.

In an identical manner, each time push buttons D–L are depressed, a corresponding serial code will emerge from the pin 13 of the related shift register 131. The only difference will be in the code format.

The clock CC is generated in the IC 556B. The clock provides the necessary clock signal to any shift register 131 whose associated push button is depressed. In addition to providing the signal for code conversions in the shift registers 131, the clock signal is also sent through circuitry which applies it to the tape for later decoding. This is shown as the CC input to the gate 34001A.

Before the four cycle clock voltage is applied to the tape, the four cycle clock voltage CC is modulated with a higher frequency voltage EE (the fourth frequency F4 noted above) as shown in FIG. 3 and FIG. 4.

The higher frequency voltage EE is generated in one-half of the IC 556C.

The clock signal CC is necessary to keep everything in synchronism when the binary code is decoded into ones and zeros, and the high frequency voltage EE is necessary to get better response of the tape recorder since a tape recorder responds best to frequencies in the range of 300 Hertz to 5,000 Hertz. The modulating high frequency voltage EE is therefore chosen to produce a code frequency at a frequency where the tape will operate best.

The clock frequency EE is inverted through a standard model number 4049 frequency inverter IC and is applied to one input of the gate 34001A.

The normal four cycle clock voltage is applied to the other input of the gate 34001A. The resulting output at pin 3 of the gate 34001A is the modulated clock frequency FF. This modulated clock frequency insures accurate recovery of the original code.

The modulated clock frequency FF is filtered through a R-C filter in order to reduce the harmonic content. It is then applied to an amplifier model No. 3900 through a gain control resistor.

In the meantime, the serial code A' which was produced at the pin 13 of the shift register 131A, was applied to an input pin of a gate 34001B. A high frequency voltage GG (the frequency F1 noted above in reference to FIG. 1) was applied to the other input pin of the same gate 34001B. This high frequency voltage GG was generated in the second half of the dual oscillator 556C and at a different frequency from that used to modulate the clock. The code oscillator frequency GG was generated at a different frequency from that used to modulate the clock for purposes of separation in a decoding process.

At the output of the gate 34001D the tape code No. 1 (wave form HH in FIG. 4) appears with all ones (positive levels) modulated with bursts of high frequency voltage.

This modulated voltage is filtered and applied to the amplifier 3900 along with the modulated clock voltage FF described above.

The output of the amplifier 3900 is applied to the tape recorder 107 and is recorded on the related track of the tape 109.

The high frequency voltage used to modulate the code ones is at a different frequency from that used to modulate the clock signal. This is because the clock must always be applied to this tape simultaneously within a code(s) selected (by a push button) or buttons. Different modulating frequencies are necessary to separate the clock signal from the code signal during the playback mode when a decoding operation is performed.

Thus, a complex wave form is applied to the input of the amplifier 3900 and this wave form is a combination of the modulated clock frequency and a modulated code frequency.

In like manner the codes B' through F' are applied through related gates 34001 and combined with the modulated clock frequency in each case.

The codes A'-D' are all modulated with one frequency F1 (see FIG. 1). This frequency F1 is the wave form GG illustrated in FIG. 4.

The codes E'-H' are all modulated with a different frequency F2 (as described above with reference to the encoder 103 shown in FIG. 1), and the codes I'-L' are all modulated with a third frequency F3. The frequencies F2 and F3 are generated by a separate dual oscillator 556 (not shown in the drawings since the showing of this oscillator would be merely redundant to that of the oscillator 556C).

DESCRIPTION OF THE PLAYBACK OPERATION

The playback operation consists of three major circuits and two minor circuits. The three major circuits are (1) the decoder (2) the fade control and (3) the slide advance. The two minor circuits are (1) the movie projector and (2) the stop operation.

Figure 2:
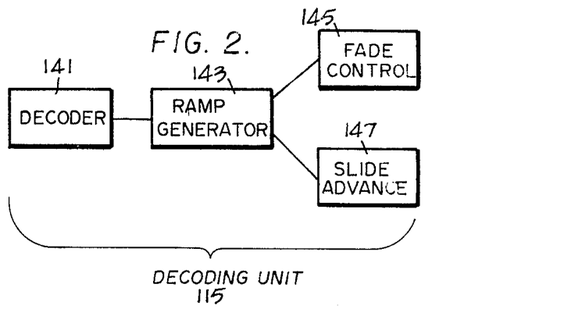
FIG. 2 is a block diagram showing component parts of the decoding unit of FIG. 1 and illustrates how the decoder, ramp generator, fade control and slide advance components are interrelated in the decoding unit.
Figure 5:
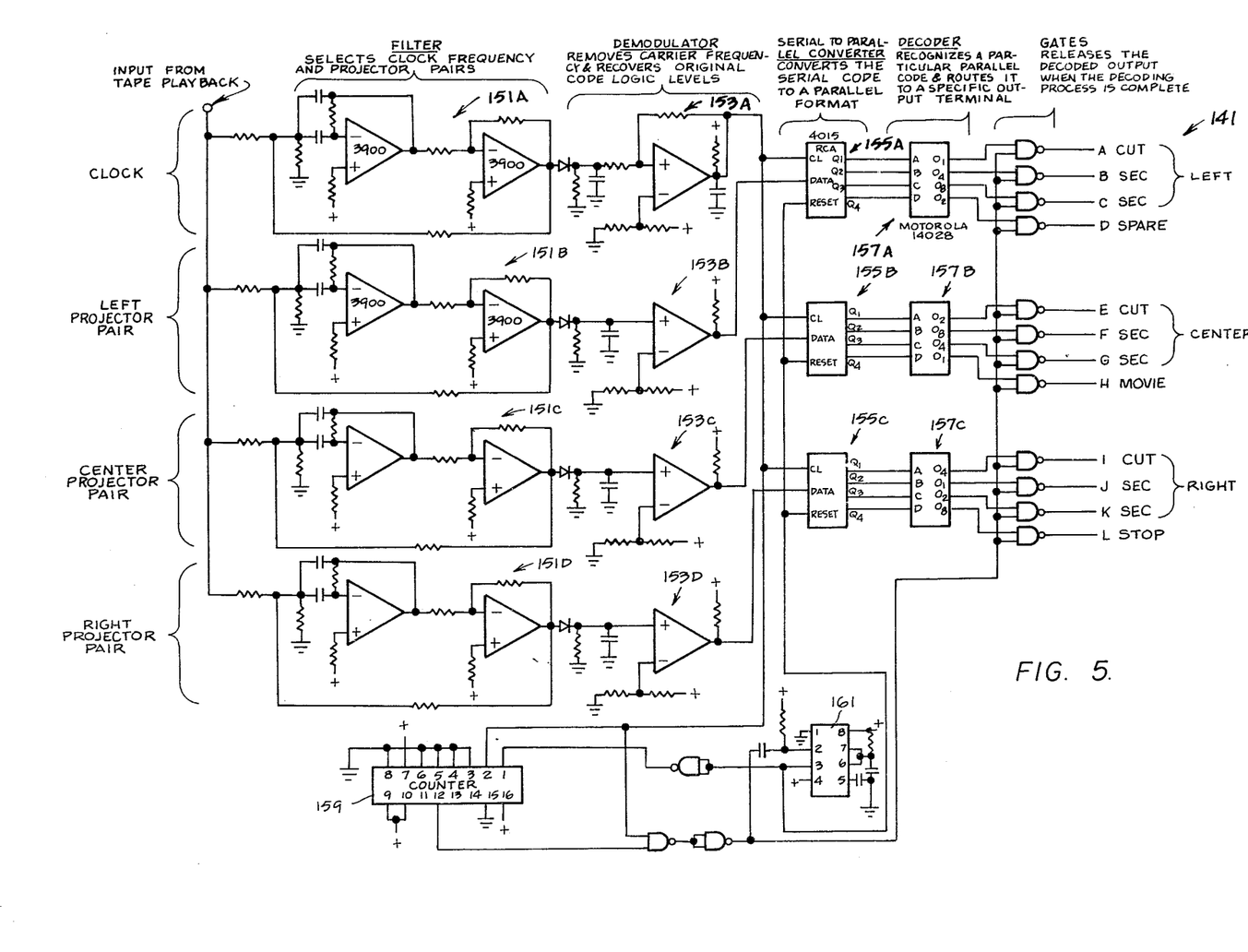
FIG. 5 is a schematic view showing circuit details of the decoder component of the decoding unit shown in FIG. 2.

The decoder is indicated generally by the reference numeral 141 in FIG. 2 and in FIG. 5.

Figures 6, 7:
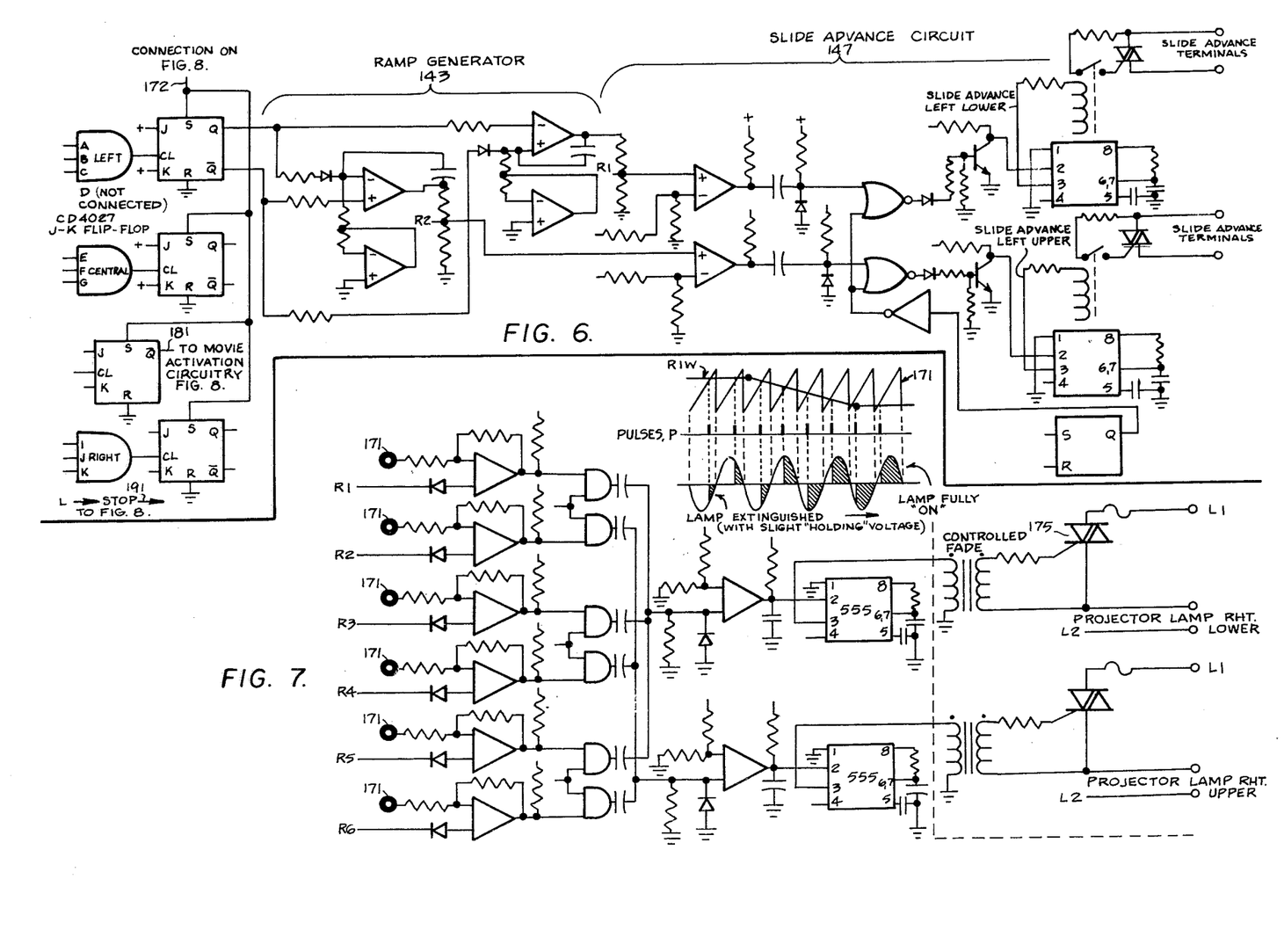
FIG. 6 is a schematic view showing circuit details of the ramp generator and slide advance components shown in FIG. 2.
FIG. 7 is a schematic view showing circuit details of the fade control component of FIG. 2.

The fade control includes a ramp generator 143 (see FIGS. 2 and 6) and a fade control 145 (see FIGS. 2 and 7).

The slide advance circuit includes the ramp generator 143 shown in FIGS. 2 and 6 and a slide advance 147 as also shown in FIGS. 2 and 6.

As illustrated in FIG. 2, the decoder 141, the ramp generator 143, the fade control 145 and the slide advance 147 all go together to make up the decoding unit 115.

THE DECODER

The control signals originally applied to the right track of the tape 109 during the encoding are taken off of the tape in a manner which recovers the original code.

In this recovery the signal voltages from the right tape track are first segregated by carrier frequency.

As illustrated in FIG. 5, the decoder 141 includes four filters which select the clock frequency and projector pairs.

The clock filter 151A and clock demodulator 153A in FIG. 5 pass and demodulate, i.e. recover for decoding purposes, the clock signal (as indicated by the legend at the lefthand side of FIG. 5).

Similarly, the filter 151B and demodulator 153B recover and demodulate the carrier frequency F1 for the left projector pair, and the filter 151C and demodulator 153C recover the carrier frequency F2 for the center projector pair, and the filter 151D and demodulator 153D recover and demodulate the carrier frequency F3 for the right projector pair.

Operational amplifiers models Nos. 3900 (made by National Semiconductor Corporation) are used in the filters 151 as indicated, and an amplifier model No. 339 (made by National Semiconductor Corporation) is used in each of the demodulators 153.

The recovered clock and code signals which are in serial form are then sent from serial to parallel converters 155A-155C as illustrated. RCA model No. 4015 converters are used in one specific embodiment of the present invention as illustrated in FIG. 5.

Each clock pulse on the clock (CL) input allows a corresponding code level (1 or 0) to enter the related converter 155 at the data input. After four clock pulses have been completed, the entire serial code appears in parallel format at outputs Q1, Q2, Q3, and Q4.

This parallel code is connected to the corresponding inputs of the decoders 157A-C. Motorola Corporation model No. 14028 decoders 157 are illustrated in FIG. 5. The parallel code is connected to the inputs A, B, C and D of the decoders 157.

Depending upon what B, C, D code is presented to the input of a decoder 157, the corresponding decimal output line will go high. All other outputs will remain low. The particular output which goes high is then routed to perform specific functions on a specific projector. Technically, the decoding operation is completed at this juncture. That is, a unique output signal is provided to perform a particular control function, depending upon which push button was depressed during the encoding operation. The decoders 157 are illustrated as having three inputs B, C, D because these units are readily available commercially and decoders having these three inputs are sufficient to provide all the control functions required for the particular control system illustrated in the drawings. However, a decoder that will handle sixteen codes, or more, can be used in place of the particular decoders 157 illustrated in FIG. 5.

Before continuing to describe the operations of the decoder 141, the reset function of the decoder will be described.

Resetting is done automatically at the end of each decoding operation by the decoders 157. Resetting is implemented with a counter 159 (Nation Semiconductor model No. 74C160 as illustrated) and an impulse generator 161 (Signetics model No. 555 as illustrated).

At the fourth clock pulse (input at pin 2 of the counter 159), the output at pin 12 goes from a low to a high level. This level change is gated with the fourth clock pulse to produce an impulse lasting for the duration of the clock pulse. This impulse opens gates A, B, C, D . . . L releasing any related decoded control signal (such as cut for A, three second fade for B, six second fade for C, etc.) to pass on and perform its particular control function.

This impulse is also fed to the impulse generator 161 which generates a second impulse following the fourth clock pulse.

This second impulse is used to reset the outputs of the serial to parallel converters 155 to zero. It also resets the counter 159 to zero.

The decoder is now ready to accept another serial code from the tape and to decode it in order to perform the next function programmed in the tape program.

All of the decoded signals at the outlet of the decoder 141 are next applied to circuits which carry out the following functions in response to the operation programmed on the tape: (1) Projector lamp fade in-out (2) slide advance (3) movie projector on-off and (4) stop.

The bulk of the programming consists of operating the fade and slide advance controls of pairs of projectors. This will be described next.

FADE CONTROL

The first step in fade control is the application of the decoded signal to the ramp generator 143. This is detailed in FIG. 6.

The ramp generator generates a signal which, in response to the decoded input, provides the lamps of the selected pair of projectors with three options:

(1) Instant changeover (cut) of the lamp status. For example, if the top projector of the left screened pair had completed its part of the program, and the coded tape program next called for a cut, then the top projector lamp would extinguish instantly, and the bottom screen would illuminate immediately.

(2) 3 second fade. If the coded signal had called for a 3 second fade, then the top projector lamp would have gradually faded out in three seconds and the bottom projector lamp would fade in during the same 3 second period.

(3) 6 second fade. A similar operation would have occured in 6 seconds if that particular code had been selected and generated by the uncoding process and put on tape.

In the particular system illustrated in the drawings there are eighteen ramp generators 143, but since each of the ramp generators is identical, only two have been illustrated in FIG. 6.

The input to each ramp generator is one of the outputs from the decoder 141, i.e. cut, 3 second fade or 6 second fade. Any one of these inputs generates a corresponding fast ramp voltage for the cut operation, a 3 second ramp voltage for the 3 second fade, and a 6 second ramp voltage for the 6 second fade.

The outputs of the ramp generators 143 appear at R1 and R2 (and through R18 for the non-illustrated ramp generators) in FIG. 6.

The fade control circuit 145 continues in FIG. 7. As illustrated in FIG. 7, each output R1–R18 of a particular ramp generator 143 is connected to a corresponding input to a fade control circuit 145.

Each fade control circuit 145 has a second input 171. This input 171 is a saw tooth generator derived from the power line frequency by the lamp voltage bias control 173 shown in FIG. 8.

The circuit 173 provides a saw tooth voltage wave form (shown diagramatically as 171W in FIG. 7) which is synchronized with the power line frequency.

Each of the eighteen controlled fade circuits 145 merely compares its saw tooth voltage input 171 with its particular ramp voltage input (see the diagrammatic wave form R1W for the R1 ramp generator in FIG. 6) to obtain a phase pulse (see the pulses P shown in FIG. 7) at each intersection of the two wave forms.

Each phase pulse then controls the turn-on time of a triac 175 feeding power to a projector lamp as indicated at the righthand side of FIG. 7.

The turn-on time is referenced to the zero crossing of each 60 cycle voltage wave by the saw tooth generator. See the schematic representation above the upper ramp generator in FIG. 7 where the 60 cycle power voltage curve is shown cross-hatched between the zero crossing of the voltage wave and the location of the pulses P produced by the intersections of the saw tooth generator wave form 171W and the ramp generator wave form R1W. A fade-in operation is illustrated in the schematic and the cross-hatched areas illustrate increasing amounts of power supplied to the projector lamp. The fade operation, in end result, appears to be the same as that of the familiar lamp dimmer.

SLIDE ADVANCE

The slide advance circuit 147 starts in FIG. 6 at the ramp generator outputs R1, R2 . . . R18 and continues on to the right end of the figure as illustrated by the upper bracket 147.

Each of the ramp generator outputs R1–R18 is fed to the plus input of a comparator circuit, i.e. the LM339.

A declining ramp voltage (during a fade operation) is compared with a fixed voltage from the voltage divider at the minus input. As the ramp crosses the fixed level, a sharp drop in voltage occurs at the output of the comparator circuit.

This is converted into a negative pulse by the capacitor and the resistor.

The negative pulse is gated through NOR gates and onto transistors which drive a model No. 555 impulse generator.

The impulse generator in turn sends a timed voltage to fire a triac switch (SC 141 in FIG. 6) which advances the slide of that particular projector.

The gating circuitry (the NOR gates) is necessary in order to select only the type of advance programmed. For example, if the six second advance is programmed, the gating circuit causes the projector which is fading out to advance its slide just as it extinguishes. That is, after a six second fade-out, the projector will have its slide advanced and ready for the next programmed fade-in.

The selection is facilitated by the model 4044 flip-flops. The Q output of these devices causes the selected pair of gates to operate. The flip-flops are in turn initiated by the programmed cut, three second or six second inputs.

THE MOVIE PROJECTOR

In the specific system illustrated, the movie projector works in conjunction with the center pair of projectors. When the movie control is programmed on, the power to the left or right side projectors is removed and power to the movie projector is initiated.

Figure 8:
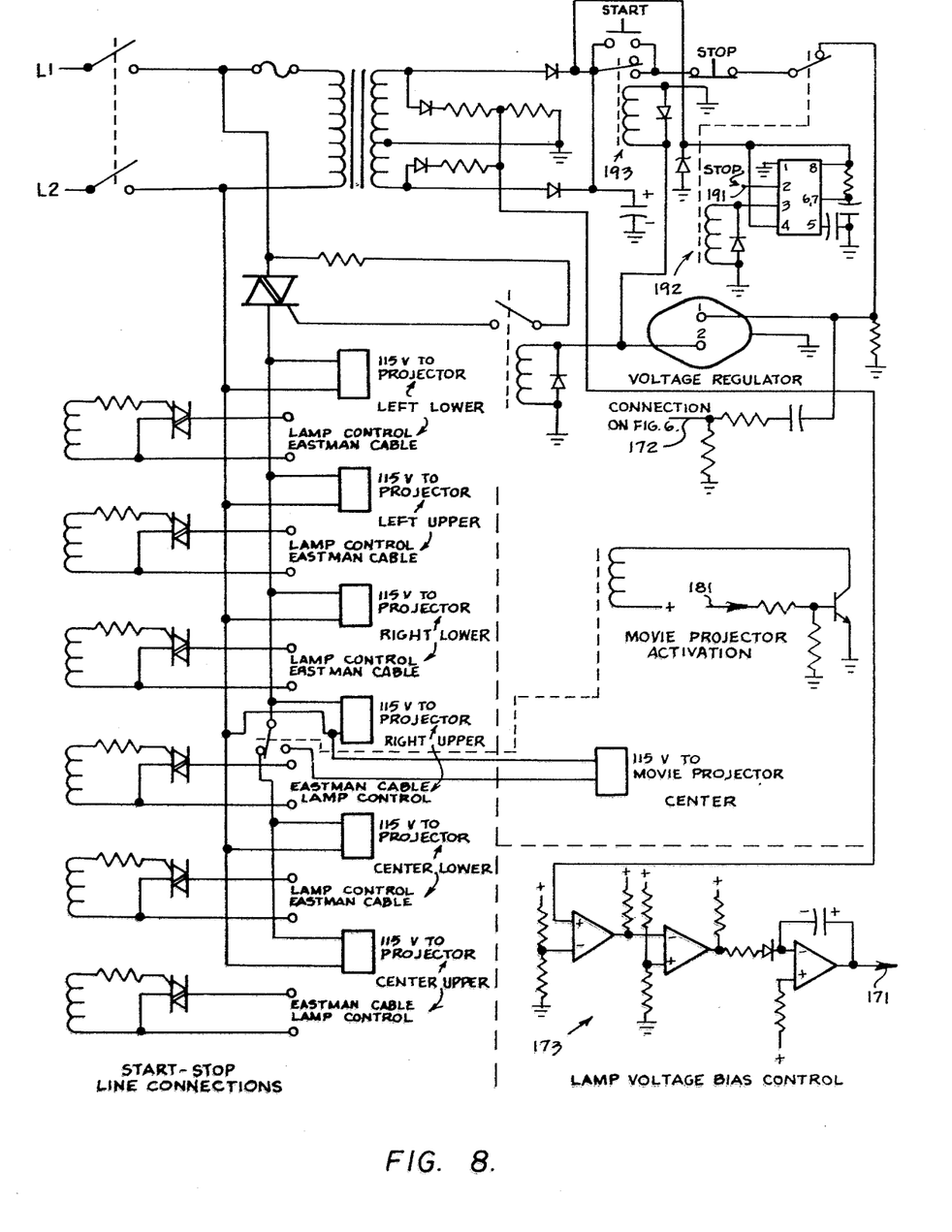

When the decoded movie input H is applied to the CL input of the JK flip-flop as illustrated in FIG. 6, the Q output (line 181) drives a transistor model No. 3391 (see FIG. 8). The transistor in turn drives a relay which switches the 115 volts AC power from the slide projectors to the movie projector.

A second programmed movie input reverses the operation. That is, the 115 volts AC power is switched back to the slide projector pair and the movie operation ceases.

STOP

When the stop (button L) is programmed, its decoded output L appears at line 191 in FIG. 8.

This decoded stop output signal is then routed to the impulse generator model No. 555.

The impulse generator operates a relay 192 whose contacts open the power supply circuit.

When the power supply circuit is opened, the interlocking contacts of a second relay 193 in this circuit are also opened because the coil of the relay 193 becomes deenergized.

The power supply circuit then becomes deenergized until the manual push button start switch (as shown in FIG. 8) is depressed.

When the stop button operates, all power to the electronic functions and projectors is removed.

The impulse generator 555 in FIG. 8 is powered by a separate source which remains on as long as the main power switch is on.

The control system of the present invention thus synchronizes the operation of a plurality of controlled elements by a pulse code recorded on one track of a magnetic tape. The pulse code comprises a unique tone frequency and binary code to provide the necessary control from the tape track. A number of the controlled elements can be operated simultaneously, or in various combinations, or separately in any desired sequence; and the operation of these control elements can be synchronized with an audio program on another track of the tape.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A control system for synchronizing the operation of a plurality of controlled mechanisms in response to control signals recorded on a magnetic tape, said system comprising recorder means for recording control signals on a magnetic tape, and encoding means for producing a plurality of separate, frequency tone-binary code, control signals with each control signal comprising a unique combination of a frequency tone and binary code and for supplying the control signals in a selectable sequence to the recorder means for recording on one track of a magnetic tape, and wherein the recorder means comprise a playback recorder and including a decoding means for receiving the control signals from an output channel of the playback recorder as the playback recorder plays back the control signals pre-recorded by the encoding means on said track of the magnetic tape, said decoding means including a decoder circuit which segregates the control signals by carrier frequency and demodulates the control signals to recover, for subsequent applied control functions, the particular binary code of each control signal, and wherein the encoding means include clock signal generating means for producing a clock signal having a given number cycle clock voltage and modulating means for modulating the clock voltage with a higher frequency voltage before the clock signal is supplied to the recorder means for recording on the tape, said encoder means also including encoder gate means for combining the modulated clock signal with each separate, tone frequency-binary code, control signal in a complex wave form before the control signal is recorded on the tape, and wherein the decoder circuit includes filter means for selecting the clock frequency and each particular control signal frequency from the complex wave forms recorded on the tape and wherein the decoder circuit also incorporates demodulating means which recover the particular binary code of each control signal in synchronism with the clock signal.

2. The invention defined in claim 1 wherein the controlled mechanisms include a plurality of slide projectors with each slide projector having a projector lamp and a slide change mechanism and wherein the decoding means include applied control circuit means for operating the projector lamps and the slide change mechanisms.

3. The invention defined in claim 2 wherein the decoding means include a fade control circuit means for fading in and fading out each projector lamp in coordination with a slide advance by the slide change mechanism of a related projector.

4. The invention defined in claim 3 wherein the fade control means are effective to provide two different selectable fade speeds for each lamp of each slide projector.

5. The invention defined in claim 3 wherein the fade control means include ramp generator means for providing a ramp generator output voltage signal whose voltage level increases with time at an inclination which is dependent upon a particular binary code signal input to the ramp generator means.

6. The invention defined in claim 5 wherein the ramp generator means include a separate ramp generator for each control signal and wherein a ramp generator output signal is connected to both the slide change mechanism and the projector lamp for a related projector.

7. The invention defined in claim 6 including saw tooth generator means for generating a saw tooth wave form in synchronism with the 60 cycle line voltage and wherein the ramp generator combines the saw tooth wave form with the ramp generator output voltage signal wave form to produce power control pulses at each intersection of the two wave forms for controlling the amount of line power supplied to the projector lamp on each alteration of the 60 cycle line power to thereby control the fade-in and fade-out of the projector lamp.

8. The invention defined in claim 3 wherein the control mechanisms include a movie projector.

9. The invention defined in claim 2 wherein the applied control circuit means include a stop circuit for discontinuing all power to the projectors in response to a stop signal produced by the encoding means.

10. The invention defined in claim 2 wherein the encoder means include shift register means for converting a parallel binary code to a serial format, oscillator means for producing the clock cycle signal, the clock modulating frequency and a plurality of separate tone frequencies for related groupings of the plurality of projectors.

11. The invention defined in claim 2 including audio input means for producing and recording an audio input on a second track of the magnetic tape and audio output means for playback of the audio input.

12. The invention defined in claim 1 wherein the decoder circuit includes filter means and demodulator means in series followed by serial to parallel converter means for converting a serial code to a parallel format, decoder units which recognize a particular parallel code and which route it to a specific output terminal, and decoder gate means which release the decoded output when the decoding process is complete.

* * * * *